United States Patent
Hong

(10) Patent No.: US 8,502,923 B2
(45) Date of Patent: Aug. 6, 2013

(54) METHOD FOR SWITCHING A CHANNEL OF AN IMAGE DISPLAY DEVICE AND APPARATUS THEREFOR

(75) Inventor: Ki-joo Hong, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1265 days.

(21) Appl. No.: 11/740,447

(22) Filed: Apr. 26, 2007

(65) Prior Publication Data

US 2008/0074557 A1 Mar. 27, 2008

(30) Foreign Application Priority Data

Sep. 22, 2006 (KR) .................. 10-2006-0092550

(51) Int. Cl.
| | |
|---|---|
| H04N 5/268 | (2006.01) |
| H04N 5/50 | (2006.01) |
| H04N 5/44 | (2006.01) |
| H04N 9/74 | (2006.01) |
| H04N 7/16 | (2006.01) |
| H04N 5/445 | (2006.01) |

(52) U.S. Cl.
USPC ........... 348/705; 348/732; 348/734; 348/584; 725/151; 725/52

(58) Field of Classification Search
None
See application file for complete search history.

(56) References Cited

U.S. PATENT DOCUMENTS

| 5,422,682 | A | * | 6/1995 | Nakade et al. ............... 348/732 |
| 6,714,264 | B1 | * | 3/2004 | Kempisty ..................... 348/732 |
| 2002/0104102 | A1 | * | 8/2002 | Takagi et al. ................. 725/151 |
| 2005/0204387 | A1 | * | 9/2005 | Knudson et al. ............... 725/52 |
| 2006/0028584 | A1 | * | 2/2006 | Iizuka et al. ................. 348/584 |

FOREIGN PATENT DOCUMENTS

| JP | 2002112127 A | 4/2002 |
| KR | 100298400 B1 | 9/2001 |
| KR | 10-2006-0072540 A | 6/2006 |

OTHER PUBLICATIONS

Communication dated Aug. 1, 2012 issued by the Korean Intellectual Property Office in counterpart Korean Application No. 10-2006-0092550.

* cited by examiner

*Primary Examiner* — Jefferey Harold
*Assistant Examiner* — Sean Haiem
(74) *Attorney, Agent, or Firm* — Sughrue Mion, PLLC

(57) ABSTRACT

A method for switching a channel of an image display device and an apparatus adopting the method are disclosed. The method for switching a channel includes switching a currently displayed channel to a major channel, which is adjacent to the currently displayed channel, if a channel switch command is input using a first direction key, and switching the currently displayed channel to a minor channel, which is adjacent to the currently displayed channel, if a channel switch command is input using a second direction key. Accordingly, a user can switch to a desired channel, thereby increasing user convenience, and a list of minor channels pertaining to a current channel is displayed, so that all channels provided by the broadcasting station of the current channel can be identified.

20 Claims, 4 Drawing Sheets

METHOD FOR SWITCHING A CHANNEL OF AN IMAGE DISPLAY DEVICE AND APPARATUS THEREFOR

CROSS-REFERENCE TO RELATED APPLICATIONS

This application claims priority from Korean Patent Application No. 10-2006-0092550, filed Sep. 22, 2006, in the Korean Intellectual Property Office, the entire contents of which are incorporated herein by reference.

BACKGROUND OF THE INVENTION

1. Field of the Invention

Apparatuses and methods consistent with the present invention relate to switching a channel, and image display devices which switch channels More particularly, the present invention relates to a method for switching a channel using existing navigation keys of an image display device providing a broadcast from multi-channels, and an image display device which implements said method.

2. Description of the Related Art

Image display devices display images that are received externally through an antenna. More specifically, if a user selects a desired channel, an image display device is tuned to the selected channel and displays images to be viewed by the user that are received from the channel through an antenna. Generally, image display devices include, for instance, mobile phones, personal digital assistants (PDAs) and television sets (TVs).

Recently, as the broadcasting environment has been digitalized and moving image compression technology has been developed, a frequency band of 6 MHz, which is allocated to one TV channel in an analog broadcasting environment, is set aside for one channel of high definition (HD) quality. Accordingly, terrestrial waves and cable broadcasting stations tend to provide multimode services (MMS) by adding up to six channels, such as a channel of standard definition (SD) quality, an audio channel, a data channel, into the rest of the frequency band.

Consequently, digital TVs (DTVs), as one example of an image display device, provide multiple services and increase the number of viewable channels sharply.

However, as the number of channels increases, conventional image display devices take a longer time to switch channels using up/down keys. That is, a channel of HD quality (referred to hereinafter as a "major channel") and other channels (referred to hereinafter as "minor channels") are transmitted in a frequency band for one channel by multi-channel broadcasting, so that the number of channel switches between major channels, between major channels and minor channels, and between minor channels are increased.

For example, if it is assumed that a currently viewed major channel is 7-1, there may be minor channels 7-2, 7-3, 7-4 and 7-5, and the next major channel is 8-1. If a user wants to switch to the next major channel 8-1, the user must manipulate the keys 5 times in a related art image display device.

That is, the current major channel 7-1 is switched through channels 7-2, 7-3, 7-4 and 7-5 to the channel 8-1 by pressing an up/down key 5 times.

Therefore, according to the related art channel switching method using up/down keys in a multi-channels environment, it takes a long time for users to select a desired channel, and user inconvenience due to an increased key pressing occurs.

Moreover, as a user does not know how many minor channels that a major channel has, the user must manipulate the up/down keys blindly to switch to a subsequent major channel, resulting in greater user inconvenience.

SUMMARY OF THE INVENTION

Accordingly, an aspect of the present invention provides a method for switching channels using existing navigation keys in order to switch channels more rapidly and more conveniently, and an image display device adopting the method.

Another aspect of the present invention provides a method for switching channels by reducing the number of key presses required for switching between channels, and an image display device adopting the method.

Yet another aspect of the present invention provides a method for switching channels which allows a user to conveniently switch channels by displaying minor channels together with a major channel, and an image display device adopting the method.

In order to achieve the above-described and other aspects of the present invention, a method for switching a channel is provided comprising switching a currently displayed channel to a major channel adjacent to the currently displayed channel, if a channel switch command is input using a first direction key, and switching the currently displayed channel to a minor channel adjacent to the currently displayed channel, if a channel switch command is input using a second direction key.

In the operation of switching to the major channel, the currently displayed channel may be switched to one of a subsequent major channel or a preceding major channel.

In the operation of switching to the minor channel, if the channel switch command is input using the second direction key, then whether there is any minor channel pertaining to the currently displayed channel may be determined.

In the operation of switching to the minor channel, if there is any minor channel pertaining to the currently displayed channel, then a list of minor channels including the minor channel may be displayed.

In the operation of switching to the minor channel, if a channel switch command is input in the list of minor channels using the second direction key, then the currently displayed channel may be switched to one of a subsequent minor channel or a preceding minor channel.

In the operation of switching to the minor channel, if there are no minor channels pertaining to the currently displayed channel, then the channel switch command input using the second direction key may be ignored.

In the operation of displaying the list of minor channels, the list of minor channels may be displayed in a banner form.

The list of minor channels may differentiate the number of the currently displayed channel from numbers of other channels, and may comprise left and right arrows to switch the currently displayed channel left and right.

The list of minor channels may be displayed transparently or translucently.

The first direction key may be at least one of up and down keys.

The second direction key may be at least one of left and right keys.

In order to achieve the above-described and other aspects of the present invention, an image display device is provided comprising a first direction key, a second direction key, and a controller which switches a currently displayed channel to a major channel adjacent to the currently displayed channel, if a channel switch command is input using the first direction key, and switches the currently displayed channel to a minor channel adjacent to the currently displayed channel, if a channel switch command is input using the second direction key.

The controller may switch the currently displayed channel to one of a subsequent major channel or a preceding major channel, if the channel switch command is input using the first direction key.

The controller may determine whether there is any minor channel pertaining to the currently displayed channel, if the channel switch command is input using the second direction key.

The device may further comprise an on-screen display (OSD) generator which generates a list of minor channels based on the channel map, wherein the controller operates the OSD generator to generate and display a list of minor channels including the minor channel, if there is any minor channel pertaining to the currently displayed channel.

If a channel switch command is input in the list of minor channels using the second direction key, then the controller may switch the currently displayed channel to one of a subsequent minor channel or a preceding minor channel.

The controller may ignore the channel switch command input using the second direction key, if there are no minor channels pertaining to the currently displayed channel.

The OSD generator may display the list of minor channels in a banner form.

The list of minor channels may differentiate the number of the currently displayed channel from numbers of other channels, and may comprise left and right arrows to switch the currently displayed channel to left and right directions.

The list of minor channels may be displayed transparently or translucently.

The first direction key may be at least one of up and down keys.

The second direction key may be at least one of up and down keys.

BRIEF DESCRIPTION OF THE DRAWINGS

These and/or other aspects and advantages of the invention will become apparent and more readily appreciated from the following description of the exemplary embodiments of the present invention, taken in conjunction with the accompanying drawings, in which.

DETAILED DESCRIPTION OF EXEMPLARY EMBODIMENTS OF THE PRESENT INVENTION

Figure 1:
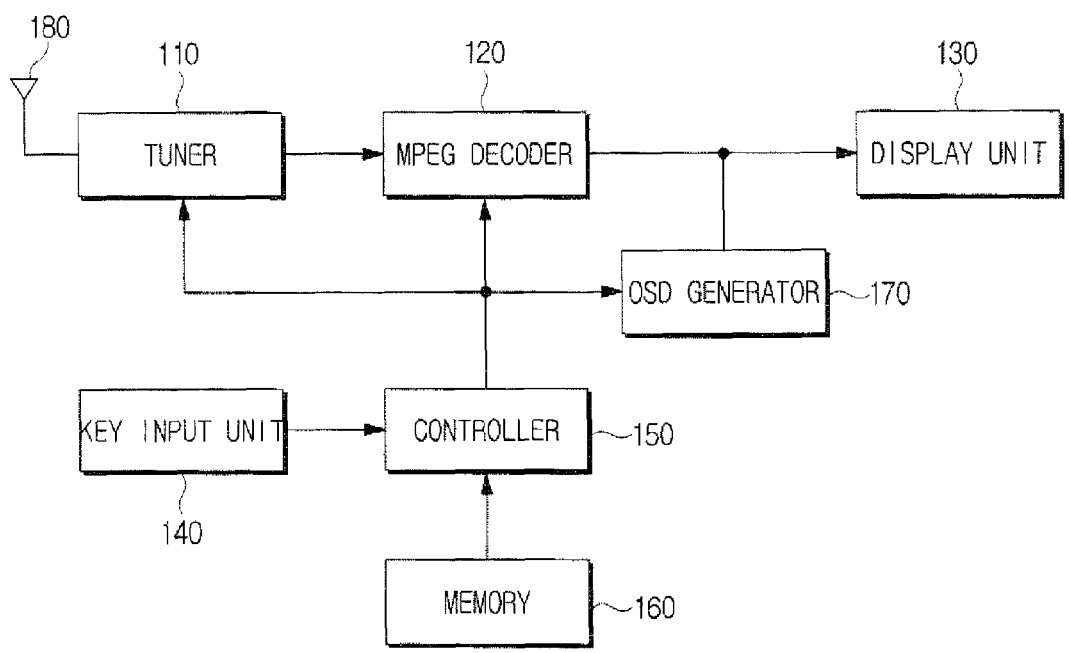
FIG. 1 is a block diagram illustrating an image display device according to an exemplary embodiment of the present invention.

Reference will now be made in detail to exemplary embodiments of the present invention, examples of which are illustrated in the accompanying drawings, wherein like reference numerals refer to like elements throughout. The exemplary embodiments are described below in order to explain the present invention by referring to the figures, but should not be construed to limit the scope of the present invention as defined by the appended claims.

FIG. 1 is a block diagram illustrating an image display device according to an exemplary embodiment of the present invention.

The exemplary image display device shown in FIG. 1 provides a method for switching channels by displaying minor channels together with a major channel and for using existing navigation keys, that is, up/down/left/right direction keys.

With reference to FIG. 1, the image display device comprises a tuner 110, a Moving Picture Experts Group (MPEG) decoder 120, a display unit 130, a key input unit 140, a controller 150, a memory 160 and an on-screen display (OSD) generator 170.

The tuner 110 receives and demodulates a digital image signal through an antenna 180. The MPEG decoder 120 then decodes the demodulated digital image signal.

The display unit 130 displays the decoded digital image signal. The key input unit 140 comprises navigation keys, that is, up/down/left/right direction keys in order for a user to input an instruction to switch the channel. The key input unit 140 may be implemented, for example, with a remote control, which outputs a manipulation signal according to a user command, and a remote control signal receiver, which receives the signal output from the remote control and transmits the signal to the controller 150. Additionally, the key input unit 140 may be implemented, for example, with an input unit mounted on the image display device.

If the key input unit 140 is implemented with a remote control and a remote control signal receiver, then the key input unit 140 receives a signal from the remote control signal receiver, the transmission of which is initiated using the up/down/left/right direction keys on the remote control, and transmits the signal to the controller 150. Alternatively, if the key input unit 140 is mounted on the image display device, then the key input unit 140 transmits a signal, the transmission of which is initiated using the up/down/left/right direction keys on the key input unit 140, directly to the controller 150.

If up/down signals are input through the navigation keys on the key input unit 140, then the controller 150 switches channels between major channels based on a channel map stored in the memory 160. That is, the up/down keys among the navigation keys on the key input unit 140 input up/down signals to switch the channel up or down, respectively, and are used for channel switching between major channels.

If left/right signals are input through the navigation keys on the key input unit 140, then the controller 150 switches the channel between minor channels based on the channel map stored in the memory 160. That is, the left/right keys among the navigation keys on the key input unit 140 input left/right signals to switch the channel left or right, respectively, and are used for channel switching between minor channels.

If the left/right signals are input, the controller 150 operates the OSD generator 170 to generate a list of the minor channels pertaining to the current major channel based on the channel map stored in the memory 160.

The memory 160 stores a channel map. The channel map comprises a plurality of available major channels and a plurality of minor channels pertaining to each major channel.

Table 1 shows an example of the channel map stored in the memory 160.

TABLE 1

| Major channel | Minor channel |
| --- | --- |
| 6-1 | 6-2, 6-3 |
| 7-1 | 7-2, 7-3, 7-4, 7-5 |
| 9-1 | 9-2, 9-3, 9-4 |
| 10-1 | |
| 11-1 | 11-2, 11-3 |
| 20-1 | 20-2 |

As shown in Table 1, the channel map comprises major channels 6-1, 7-1, 9-1, 10-1, 11-1 and 20-1, major channel 6-1 comprises minor channels 6-2 and 6-3, major channel 7-1 comprises minor channels 7-2, 7-3, 7-4 and 7-5, major channel 9-1 comprises minor channels 9-2, 9-3 and 9-4, major channel 10-1 does not comprise any minor channels, major channel 11-1 comprises minor channels 11-2 and 11-3, and major channel 20-1 comprises minor channel 20-2.

The OSD generator 170 generates the list of minor channels pertaining to the current major channel based on the channel map stored in the memory 160, by control of the controller 150, and displays the list of the minor channels on the display unit 130. The OSD generator 170 generates the list of the minor channels in a banner form.

Figure 2:
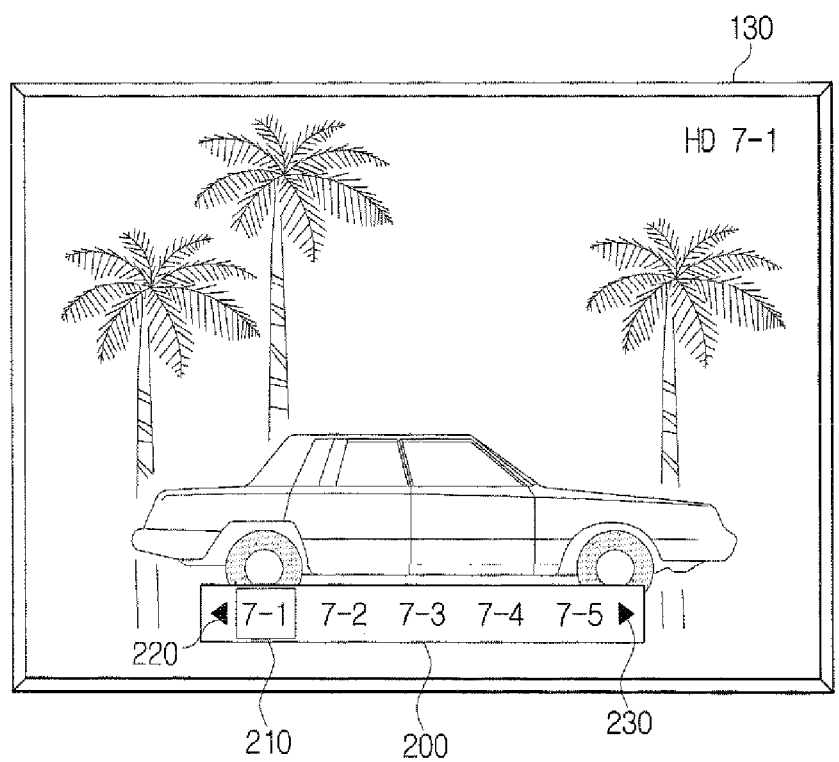
FIG. 2 illustrates an example of displaying minor channels according to a method for switching a channels in an image display device according to an exemplary embodiment of the present invention.

FIG. 2 shows an example of a minor channel display method according to a method for switching channels in an image display device according to an exemplary embodiment of the present invention.

In FIG. 2, the display unit 130 displays a digital image decoded by the MPEG decoder 120, for example, an image received through major channel 7-1, and also displays a list of the channels 200 pertaining to major channel 7-1.

The list of channels 200 shows the numbers of major channel 7-1 and shows minor channels 7-2, 7-3, 7-4 and 7-5 pertaining to the major channel. A cursor 210 indicates the number of the currently displayed channel, and left and right arrows 220 and 230 indicate switching to a lower channel, and a higher channel, respectively.

The left and right arrows 220 and 230 correspond to the left/right keys, respectively, among the navigation keys on the key input unit 140.

The number of the currently displayed channel may be indicated using the cursor 210, for example, but may also be indicated in a different color, flickering or a different font from numbers of other channels.

The list of the channels 200 may be displayed horizontally or vertically, and may be displayed on the top, bottom, left, right or center of the display.

Furthermore, the list of channels 200 may be displayed transparently or translucently so as to show the currently displayed image.

Figure 3:
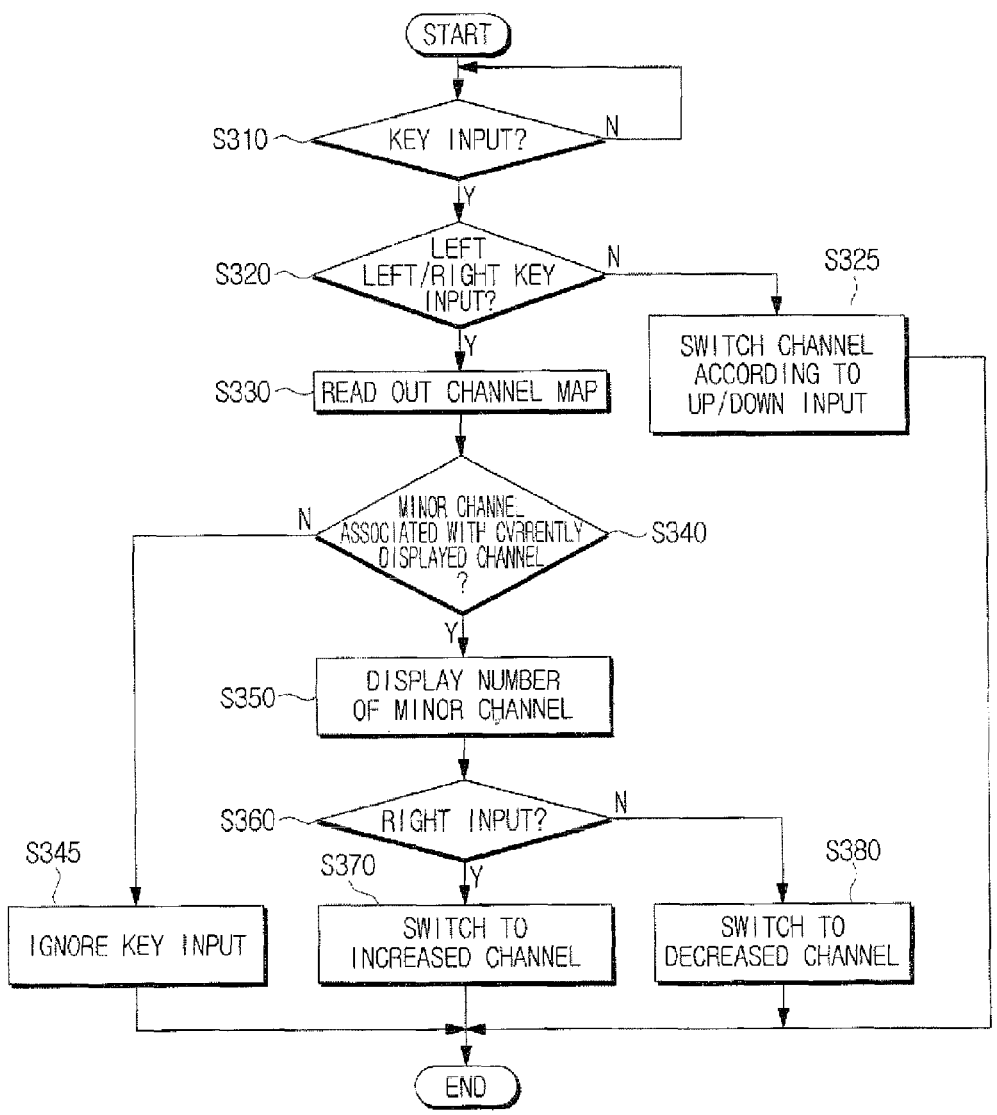
FIG. 3 is a flow chart illustrating a method for switching channels of an image display device according to an exemplary embodiment of the present invention.

FIG. 3 is a flow chart illustrating a method for switching the channel of an image display device according to an exemplary embodiment of the present invention.

In FIG. 3, the controller 150 determines whether there is a key input in operation (S310). The controller 150 determines that there is a key input, for instance, if a signal is input from the keys on the key input unit 140.

If there is a key input (S310-Y), then the controller 150 determines whether the key input is input from left/right keys among the navigation keys on the key input unit 140 in operation (S320).

If the key input is not input from left/right keys among the navigation keys on the key input unit 140, that is, the key input is input from up/down keys (S320-N), then the controller 150 switches the channel according to up/down input in operation (S325). In greater detail, for example, if current major channel 7-1 is displayed and a key input is input using the up key, then the controller 150 switches to the next major channel, that is, major channel 9-1 based on the channel map of Table 1. Alternatively, if a key input is input using the down key, then the controller 150 switches to the preceding major channel, that is, for example, major channel 6-1 based on the channel map of Table 1.

Even if the current displayed channel is a minor channel, for example, 7-2, if a key input is input from the up key, then the controller 150 switches to the next major channel, that is, major channel 9-1. Accordingly, up/down input is used for switching between major channels.

In operation (S320), if the key input is input using the left/right keys (S320-Y), then the controller 150 reads out a channel map stored in the memory 160 in operation (S330).

Subsequently, the controller 150 determines whether there is any minor channel associated with the currently displayed channel based on the channel map in operation (S340).

If there are no any minor channels associated with the currently displayed channel (S340-N), then the controller 150 ignores the left/right key input in operation (S345). That is, the controller 150 does not perform any operation corresponding to the key input. Major channel 10-1 of Table 1, for example, corresponds to this case wherein a channel is not associated with any minor channels.

If there is a minor channel associated with the currently displayed channel (S340-Y), then the controller 150 operates the OSD generator 170 to generate and display a list of minor channels, including the next minor channel, on the display unit 130 in operation (S350).

Subsequently, the controller 150 determines whether a signal corresponding to the right key is input in operation (S360). That is, if a signal corresponding to the left/right keys is input (S320-Y), then the controller 150 displays the list of minor channels, and then if another signal corresponding to the left/right keys is input thereafter, an operation corresponding to the particular key input is performed.

If a signal corresponding to the right key is input (S360-Y), then the controller 150 switches to the next channel (i.e., an increased channel) in operation (S370). More specifically, the controller 150 switches to the channel sequentially following the currently displayed major channel 7-1, that is, for example, minor channel 7-2.

If a signal corresponding to the right key is not input, that is, a signal corresponding to the left key is input (S360-N), then the controller 150 switches to the preceding channel (i.e., a decreased channel) in operation (S380). More specifically, the controller 150 switches to a channel sequentially preceding the currently displayed major channel 7-1, that is, according to the exemplary embodiment under discussion, minor channel 7-5. This is because the numbers of channels are arranged such that a channel subsequent to 7-5 is 7-1 and a channel prior to 7-1 is 7-5.

Figure 4:
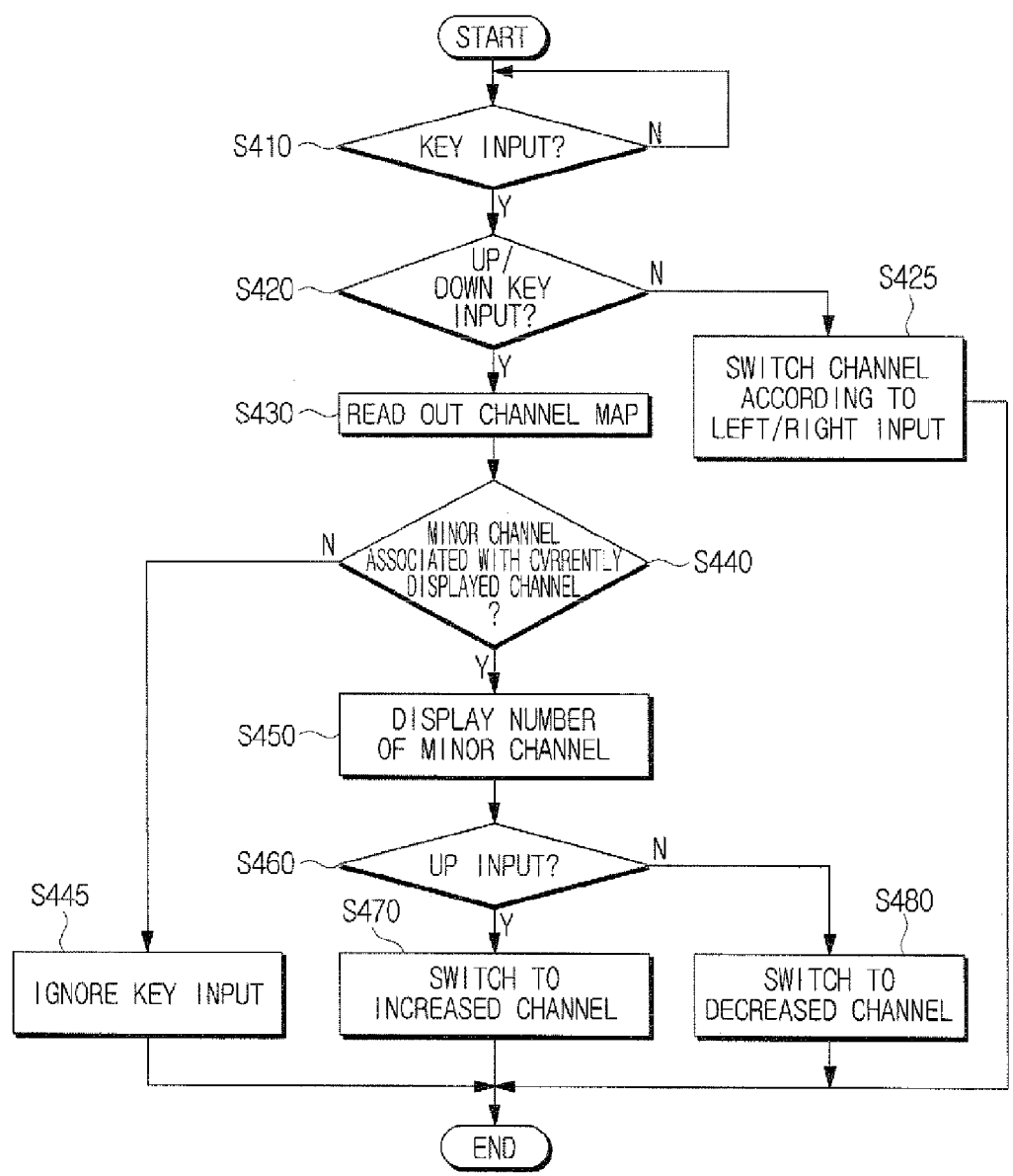
FIG. 4 is a flow chart illustrating a method for switching channels of an image display device according to another exemplary embodiment of the present invention.

FIG. 4 is a flow chart illustrating a method for switching the channel of an image display device according to another exemplary embodiment of the present invention.

In FIG. 3, an up/down key input corresponds to channel switching between major channels, and a left/right key input corresponds to channel switching between minor channels. However, in FIG. 4, an up/down key input corresponds to channel switching between minor channels, and a left/right key input corresponds to channel switching between major channels.

In greater detail, the controller 150 determines whether there is a key input in operation (S410). The controller 150 determines that there is a key input, for instance, if a signal is input from the keys on the key input unit 140.

If there is a key input (S410-Y), then the controller 150 determines whether the key input is input from the up/down keys among the navigation keys on the key input unit 140 in operation (420).

If the key input is not input from up/down keys among the navigation keys on the key input unit 140, that is, if the key input is input from left/right keys (S420-N), then the controller 150 switches the channel according to the left/right input in operation (S425). In greater detail, for example, if current major channel 7-1 is displayed and a key input is input from the right key, then the controller 150 switches to the next major channel, that is, major channel 9-1 based on the channel map of Table 1. Alternatively, if a key input is input from the left key, then the controller 150 switches to the preceding major channel, that is, for example, major channel 6-1 based on the channel map of Table 1.

Even if the current displayed channel is a minor channel, for example, 7-2, if a key input is input from the right key, then the controller 150 switches to an subsequent major channel, that is, according to the exemplary embodiment under discussion, major channel 9-1. Thus, left/right input is used for switching between major channels.

In operation (S420), if the key input is input using up/down keys (S420-Y), then the controller 150 reads out a channel map stored in the memory 160 in operation (S430).

Subsequently, the controller 150 determines whether there is any minor channel pertaining to the currently displayed channel based on the channel map in operation (S440).

If there are no minor channels associated with the currently displayed channel (S440-N), then the controller 150 ignores the up/down key input in operation (S445). That is, the controller 150 does not perform any operation corresponding to the key input. Major channel 10-1 of Table 1, for example, corresponds to this case wherein a channel is not associated with any minor channels.

If there is a minor channel associated with the currently displayed channel (S440-Y), then the controller 150 operates the OSD generator 170 to generate and display a list of minor channels, including the next minor channel on the display unit 130 in operation (S450).

Subsequently, the controller 150 determines whether a signal corresponding to the right key is input in operation (S460). That is, if a signal corresponding to the up/down keys is input (S420-Y), then the controller 150 displays the list of minor channels, and then if another signal corresponding to the up/down keys is input thereafter, an operation corresponding to the particular key input is performed.

If a signal corresponding to the up key is input (S460-Y), then the controller 150 switches to a subsequent channel (i.e., an increased channel) in operation (S470). More specifically, the controller 150 switches to the channel following the currently displayed major channel 7-1, that is, for example, minor channel 7-2.

If a signal corresponding to the up key is not input, that is, a signal corresponding to the down key is input (S460-N), then the controller 150 switches to a preceding channel (i.e., a decreased channel) in operation (S480). More specifically, the controller 150 switches to the channel sequentially preceding the currently displayed major channel 7-1, that is, according to the exemplary embodiment under discussion, minor channel 7-5. This is because numbers of channels are arranged such that the channel following 7-5 is 7-1 and the channel preceding 7-1 is 7-5.

It is described that if a signal corresponding to the left/right keys is input, a list of minor channels is generated and displayed, but this is just an exemplary embodiment of the present invention. As another example, a menu for requesting a list of minor channels is provided, and if a user selects the list of minor channels from the menu, a list of minor channels may be generated and displayed. Or, a particular key for requesting a list of minor channels other than the left/right keys is provided, and if a signal corresponding to the particular key is input, a list of minor channels may be generated and displayed. Additionally, navigation direction keys are used in the preceding exemplary embodiments, but other manipulation means to input a channel switch command may be used consistent with the present invention.

As can be appreciated from the above description, a user can switch to a desired channel, thereby increasing user convenience.

Furthermore, channel switching is available with less key manipulation. In addition, a list of minor channels pertaining to the current channel is displayed by selecting the left/right keys, and thus all channels provided by the broadcasting station of the current channel can be identified.

The foregoing exemplary embodiments and advantages are merely exemplary and are not to be construed as limiting the present invention. The present teachings can be readily applied to other types of apparatuses. Also, the description of the exemplary embodiments of the present invention is intended to be illustrative, and not to limit the scope of the claims as defined by the following claims, and many alternatives, modifications, and variations will be apparent to those skilled in the art without departing from the spirit and scope of the present invention.

What is claimed is:

1. A method for switching a channel, the method comprising:
   storing a channel map comprising a plurality of selectable major channels and a plurality of minor channels pertaining to each major channel;
   switching a currently displayed channel to a different major channel, which is adjacent to a major channel of the currently displayed channel, when a major channel switch command is input using a first direction key;
   displaying the currently switched channel and only a list of minor channels associated with the currently switched channel in a form of bar using an on-screen display (OSD) method when there are minor channels pertaining to the major channel of the currently displayed channel based on the channel map, and
   switching the currently displayed channel to a different minor channel, which is one channel of the displayed list, when a minor channel switch command is input using a second direction key;
   wherein the first direction key and the second direction key are provided on four-direction navigation keys.

2. The method of claim 1, wherein the switching to the major channel comprises switching the currently displayed channel to one of a subsequent major channel and a preceding major channel.

3. The method of claim 1, wherein the switching to the minor channel comprises determining whether there is a minor channel pertaining to the currently displayed channel.

4. The method of claim 3, wherein the switching to the minor channel comprises, when there is a minor channel pertaining to the currently displayed channel, displaying a list of minor channels pertaining to the currently displayed channel.

5. The method of claim 4, wherein the switching to the minor channel comprises, when a channel switch command is input using the list of minor channels and using the second direction key, switching the currently displayed channel to one of a subsequent minor channel and a preceding minor channel.

6. The method of claim 3, wherein the switching to the minor channel comprises, when there are no minor channels pertaining to the currently displayed channel, ignoring the channel switch command input using the second direction key.

7. The method of claim 4, wherein the list of minor channels differentiates a number of the currently displayed channel from numbers of other channels, and
wherein the list of minor channels comprises a left arrow and a right arrow, which switch the currently displayed channel.

8. The method of claim 4, wherein the list of minor channels is displayed transparently or translucently.

9. The method of claim 1, wherein the first direction key comprises at least one of an up and a down key.

10. The method of claim 1, wherein the second direction key comprises at least one of a left key and a right key.

11. An image display device comprising:
a first direction key for selecting major channels;
a second direction key for selecting minor channels pertaining to each of the major channels;
a memory for storing a channel map comprising a plurality of selectable major channels and a plurality of minor channels pertaining to each major channel;
an on-screen display(OSD) generator for generating a list minor channels based on the channel map; and
a controller;
wherein the controller switches a currently displayed channel to a different major channel, which is adjacent to a major channel of the currently displayed channel, when a major channel switch command is input using the first direction key,
wherein the controller controls the on-screen display (OSD) generator to display the currently switched channel and only a list of minor channels associated with the currently switched channel in a form of bar,
wherein the controller switches the currently displayed channel to a different minor channel, which is one channel of the displayed list, when a minor channel switch command is input using the second direction key, and
wherein the first direction key and the second direction key are provided on four-direction navigation keys.

12. The device of claim 11, wherein the controller switches the currently displayed channel to one of a subsequent major channel and a preceding major channel, when a channel switch command is input using the first direction key.

13. The device of claim 11, wherein the controller determines whether there is a minor channel pertaining to the currently displayed channel, when a channel switch command is input using the second direction key.

14. The device of claim 13,
wherein the controller operates the OSD generator so as to generate and display the list of minor channels, when there is a minor channel pertaining to the currently displayed channel.

15. The device of claim 14, wherein when a channel switch command is input using the list of minor channels and using the second direction key, the controller switches the currently displayed channel to one of a subsequent minor channel and a preceding minor channel.

16. The device of claim 13, wherein the controller ignores the channel switch command input using the second direction key, when there are no minor channels pertaining to the currently displayed channel.

17. The device of claim 14, wherein the list of minor channels differentiates a number of the currently displayed channel from numbers of other channels, and
wherein the list of minor channels comprises a left arrow and a right arrow, which switch the currently displayed channel.

18. The device of claim 14, wherein the list of minor channels is displayed transparently or translucently.

19. The device of claim 11, wherein the first direction key comprises at least one of an up key and a down key.

20. The device of claim 11, wherein the second direction key comprises at least one of an up key and a down key.

* * * * *